(12) United States Patent
Hogan et al.

(10) Patent No.: US 8,148,486 B2
(45) Date of Patent: Apr. 3, 2012

(54) AMINE-CONTAINING ALKOXYSILYL-FUNCTIONALIZED POLYMERS

(75) Inventors: Terrence E. Hogan, Akron, OH (US); William L. Hergenrother, Akron, OH (US); Maria Tallman, Uniontown, OH (US)

(73) Assignee: Bridgestone Corporation, Tokyo (JP)

( * ) Notice: Subject to any disclaimer, the term of this patent is extended or adjusted under 35 U.S.C. 154(b) by 937 days.

(21) Appl. No.: 11/962,221

(22) Filed: Dec. 21, 2007

(65) Prior Publication Data

US 2008/0171827 A1 Jul. 17, 2008

Related U.S. Application Data

(60) Provisional application No. 60/877,536, filed on Dec. 28, 2006.

(51) Int. Cl.
  *C08G 77/26* (2006.01)
(52) U.S. Cl. ........... 528/28; 525/105; 524/588; 524/506
(58) Field of Classification Search .................. 525/105; 528/28; 524/506, 588
  See application file for complete search history.

(56) References Cited

U.S. PATENT DOCUMENTS

| | | | | |
|---|---|---|---|---|
| 3,524,900 A | * | 8/1970 | Muir et al. | 525/478 |
| 5,066,721 A | * | 11/1991 | Hamada et al. | 525/102 |
| 5,210,246 A | * | 5/1993 | Tanaka et al. | 556/413 |
| 5,508,333 A | | 4/1996 | Shimizu | |
| 5,717,022 A | * | 2/1998 | Beckmann et al. | 524/493 |
| 5,925,779 A | * | 7/1999 | Cray et al. | 556/425 |
| 6,008,295 A | | 12/1999 | Takeichi et al. | |
| 6,294,624 B1 | * | 9/2001 | Inoue et al. | 526/93 |
| 6,313,210 B1 | | 11/2001 | Lin et al. | |
| 6,482,912 B2 | * | 11/2002 | Boudjouk et al. | 528/15 |
| 7,449,537 B2 | * | 11/2008 | Boudjouk et al. | 528/28 |
| 7,498,293 B2 | * | 3/2009 | Piccinelli et al. | 508/207 |
| 2007/0185267 A1 | | 8/2007 | Kobayashi et al. | |

FOREIGN PATENT DOCUMENTS

| | | |
|---|---|---|
| EP | 1721930 A | 11/2006 |
| RU | 2235740 C2 | 9/2004 |

OTHER PUBLICATIONS

European Search Report for Application No. EP 07 25 5057, dated May 28, 2009.

* cited by examiner

*Primary Examiner* — Margaret Moore
(74) *Attorney, Agent, or Firm* — Meredith E. Hooker; Arthur M. Reginelli

(57) ABSTRACT

An amine-containing alkoxysilyl-functionalized polymer, a method of preparing a reactive polymer functionalized with an alkoxysilane functionalizing agent and further reacted with an amino alcohol, the resulting polymer, and vulcanizates thereof.

19 Claims, No Drawings

AMINE-CONTAINING ALKOXYSILYL-FUNCTIONALIZED POLYMERS

This application claims the benefit of U.S. Provisional Application No. 60/877,536 filed Dec. 28, 2006, which is incorporated herein by reference.

FIELD OF THE INVENTION

One or more embodiments of the present invention are directed to amine-containing alkoxysilyl-functionalized polymers and methods of making the same. The functionalized polymers are useful in producing vulcanized products, including tires.

BACKGROUND OF THE INVENTION

In the art of making tires, it is desirable to employ rubber vulcanizates that demonstrate reduced hysteresis loss, i.e., less loss of mechanical energy to heat. Functionalized polymers have been employed to reduce hysteresis loss in rubber compounds.

Because functionalized polymers are advantageous for use in rubber compounding, especially in the preparation of tire compositions, there exists a need for additional functionalized polymers, including those containing multiple different functionalities, and methods of preparing the same.

SUMMARY OF THE INVENTION

In one embodiment, the present invention includes a functionalized polymer defined by the formula

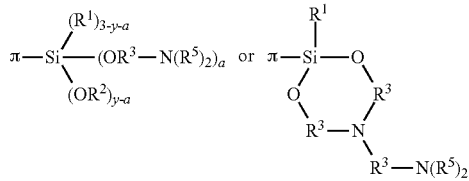

where π is a polymer chain, each $R^1$ is independently chlorine, bromine, iodine, fluorine, a monovalent organic group or an alkoxy group; each $R^2$ is independently hydrogen or a monovalent organic group; each $R^5$ is independently $(R^3NR^3R^1)$, $R^3$ is independently a divalent organic group, a is an integer from 1 to 3, y is an integer from 1 to 3, and $a+y \leq 3$.

In another embodiment, the present invention provides a method for preparing a functionalized polymer, the method comprising: reacting a reactive polymer with an alkoxysilane functionalizing agent to produce an alkoxysilyl-functionalized polymer and further reacting the alkoxysilyl-functionalized polymer with an amino alcohol.

In another embodiment, the present invention includes the vulcanization product of a functionalized polymer that is prepared by reacting a reactive polymer with an alkoxysilane functionalizing agent to produce an alkoxysilyl-functionalized polymer; and reacting the alkoxysilyl-functionalized polymer with an amino alcohol.

In yet another embodiment, the present invention includes an article comprising: at least one vulcanized rubber and a filler, where the at least one vulcanized rubber includes the vulcanization product of a functionalized polymer defined by the formula

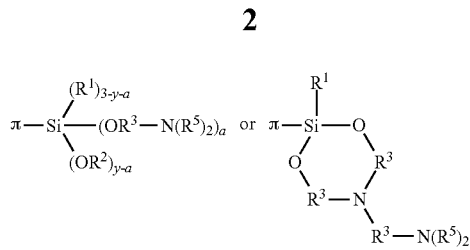

where π is a polymer chain, each $R^1$ is independently chlorine, bromine, iodine, fluorine, a monovalent organic group or an alkoxy group; each $R^2$ is independently hydrogen or a monovalent organic group; each $R^5$ is independently $(R^3NR^3R^1)$, $R^3$ is independently a divalent organic group, a is an integer from 1 to 3, y is an integer from 1 to 3, and $a+y \leq 3$.

A tire comprising: at least one vulcanized rubber and an filler, where the at least one vulcanized rubber comprises a vulcanization product of a functionalized polymer that is prepared by reacting a reactive polymer with an alkoxysilane functionalizing agent to produce an alkoxysilyl-functionalized polymer; and reacting the alkoxysilyl-functionalized polymer with an amino alcohol.

In yet another embodiment, the present invention provides a method of further functionalizing a polymer containing an alkoxysilyl functional group, the method comprising introducing a polymer containing at least one alkoxysilyl functional group with an amino alcohol.

DETAILED DESCRIPTION OF ILLUSTRATIVE EMBODIMENTS

One or more embodiments of the present invention are directed toward further enhancing the functionality of alkoxysilyl-functionalized polymers by reacting or treating them with an amino alcohol. The resulting functionalized polymers of one or more embodiments are useful for forming filled vulcanizates that demonstrate advantageously low hysteresis loss, and therefore the polymers are particularly useful for preparing tires and components thereof.

The resulting functionalized polymer of one or more embodiments of this invention can be represented by the formulas

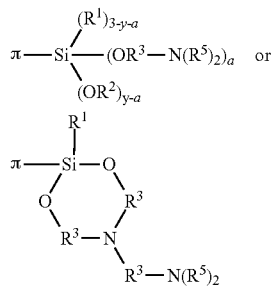

where π is a polymer chain, each $R^1$ is independently chlorine, bromine, iodine, fluorine, a monovalent organic group or an alkoxy group; each $R^2$ is independently hydrogen or a monovalent organic group; each $R^5$ is independently $(R^3NR^3R^1)$, $R^3$ is independently a divalent organic group, a is an integer from 1 to 3, y is an integer from 1 to 3, and $a+y \leq 3$. Those skilled in the art understand that the variable a may be greater than the variable y, which means that the substituent —$OR^2$ is not present.

Practice of one or more embodiments of the present invention is not limited by the polymer chain π. In certain embodiments, the polymer chain is saturated, and in other embodiments the polymer chain is unsaturated. In certain embodiments, the polymer chain is a thermoplastic polymer, and in other embodiments, the polymer chain is amorphous or only slightly crystalline. In particular embodiments, the polymer chain has a glass transition temperature (Tg) that is less than 0° C., in other embodiments less than −20° C., and in other embodiments less than −30° C. In one embodiment, the polymers may exhibit a single glass transition temperature.

In one or more embodiments, the polymer chain π is an elastomer, which refers to a polymer chain that is capable of being vulcanized into a vulcanizate exhibiting elastomeric properties.

In one or more embodiments, the polymer chain π is a homopolymer, and in other embodiments the polymer chain π is a copolymer, which refers to a polymer having two or more chemically distinct mer units. In one or more embodiments, the mer units of the polymer may be cis, trans, or vinyl.

In particular embodiments, the polymer chain π is a polydiene having a cis-1,4-linkage content that is greater than about 60%, in other embodiments greater than about 75%, in other embodiments greater than about 90%, and in other embodiments greater than about 95%. Also, these polymers may have a 1,2-linkage content (i.e. vinyl content) that is less than about 7%, in other embodiments less than 5%, in other embodiments less than 2%, and in other embodiments less than 1%. The cis-1,4- and 1,2-linkage contents can be determined by infrared spectroscopy. The number average molecular weight ($M_n$) of these polydienes may be from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question. The polydispersity of these polydienes may be from about 1.5 to about 5.0, and in other embodiments from about 2.0 to about 4.0. Exemplary high cis-polydienes include cis-1,4-polybutadiene, cis-1,4-polyisoprene, and cis-1,4-poly (butadiene-co-isoprene).

In one or more embodiments, the polymer chain π is a medium or low cis polydiene (or polydiene copolymer) including those prepared by anionic polymerization techniques. These polydienes can have a cis content of from about 10% to about 70%, in other embodiments from about 15% to about 60%, and in other embodiments from about 20% to about 50%, where the percentages are based upon the number of diene mer units in the cis configuration versus the total number of diene mer units. These polydienes may also have a 1,2-linkage content (i.e. vinyl content) from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1,4-linkage configuration.

In particular embodiments, the polymer chain π is a random copolymer of butadiene, styrene, and optionally isoprene. In other embodiments, the polymer chain π is a block copolymer of polybutadiene, polystyrene, and optionally polyisoprene. In particular embodiments, the polymer chain is hydrogenated or partially hydrogenated. In particular embodiments, where the polydiene polymer is prepared by employing a functional anionic initiator, the head of the polymer chain (π) includes a functional group that is the residue of the functional initiator.

In one or more embodiments, the polymer chain π is an anionically-polymerized polymer selected from the group consisting of polybutadiene, functionalized polyisoprene, functionalized poly(styrene-co-butadiene), functionalized poly(styrene-co-butadiene-co-isoprene), functionalized poly(isoprene-co-styrene), and functionalized poly(butadiene-co-isoprene). The number average molecular weight ($M_n$) of these polymers may be from about 5,000 to about 1,000,000, in other embodiments from about 50,000 to about 500,000, and in other embodiments from about 100,000 to about 300,000, as determined by using gel permeation chromatography (GPC) calibrated with polystyrene standards and Mark-Houwink constants for the polymer in question. The polydispersity of these polymers may be from about 1.0 to about 3.0, and in other embodiments from about 1.1 to about 2.0.

Monovalent organic groups may include hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. In one or more embodiments, the monovalent organic groups will not react with a living polymer.

In one or more embodiments, $R^1$ is a monovalent group that includes a functionality that can react with (e.g. undergo a substitution or addition reaction) with a pseudo-living polymer (e.g. a polymer prepared with a lanthanide-based catalyst system). Examples of functionalities that react with a pseudo-living polymer include those disclosed in U.S. Patent Application Publication No. 2008/0182954, which is incorporated by reference herein. Specific examples include ketone, aldehyde, amide, ester, imidazolidinone, isocyanate, isothiocyanate, epoxide, imine, amino ketone, and acid anhydride groups. In one embodiment, the functionality is an epoxide group such as that of 3-glycidoxypropyltrimethoxysilane (GPMOS).

Divalent organic groups may include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group containing from 1 carbon atom, or the appropriate minimum number of carbon atoms to form the group, up to about 20 carbon atoms. Substituted hydrocarbylene groups include hydrocarbylene groups in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms.

In one or more embodiments, the functionalized polymers of this invention may be prepared by reacting a reactive polymer with an alkoxysilane functionalizing agent to produce an alkoxysilyl-functionalized polymer that may be represented by the formula

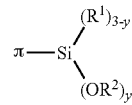

where π is a polymer chain; $R^1$ is independently chlorine, bromine, iodine, fluorine, or a monovalent organic group; each $R^2$ is independently hydrogen or a monovalent organic group; and y is an integer from 1 to 3. Formation of an alkoxysilyl-functionalized polymer by reacting a reactive polymer with a n alkoxysilan functionalizing agent advantageously produces a polymer with chain end functionalization.

The alkoxysilyl-functionalized polymer may be further reacted with an amino alcohol having the formula

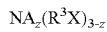

$$NA_z(R^3X)_{3-z}$$

where A is independently H or a monovalent organic group; $R^3$ is independently a divalent organic group; X is H, $NH_2$, $N(R^2)_2$ or OH; each $R^2$ is independently a monovalent organic group; z is 0, 1 or 2; and wherein at least one X is OH.

Alkoxysilane functionalizing agents include any siloxane compound that will react with the reactive terminal of a reactive polymer chain to form an alkoxysilyl-functionalized polymer. In one or more embodiments, alkoxysilane functionalizing agents may be represented by the formula

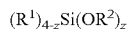

$$(R^1)_{4-z}Si(OR^2)_z$$

where each $R^1$ is independently chlorine, bromine, iodine, fluorine; or a monovalent organic group, each $R^2$ is independently hydrogen or a monovalent organic group, and z is an integer from 1 to 4. Examples of alkoxysilane functionalizing agents include tetraalkoxysilanes, alkylalkoxysilanes, arylalkoxysilanes, alkenylalkoxysilanes, and haloalkoxysilanes.

Examples of tetraalkoxysilane compounds include tetramethyl orthosilicate, tetraethyl orthosilicate, tetrapropyl orthosilicate, tetrabutyl orthosilicate, tetra(2-ethylhexyl) orthosilicate, tetraphenyl orthosilicate, tetratoluoyloxysilane, and the like.

Examples of alkylalkoxysilane compounds include methyltrimethoxysilane, methyltriethoxysilane, methyltri-n-propoxysilane, methyltri-n-butoxysilane, methyltriphenoxysilane, ethyl trimethoxysilane, ethyltriethoxysilane, ethyltri-n-propoxysilane, ethyltri-n-butoxysilane, ethyltriphenoxysilane, dimethyldimethoxysilane, dimethyldiethoxysilane, dimethyldi-n-propoxysilane, dimethyldi-n-butoxysilane, dimethyldiphenoxysilane, diethyldimethoxysilane, diphenyldimethoxysilane, 3-glycidoxypropyltrimethoxysilane (GPMOS), α-methacryloxy propyl trimethoxysilane, N,N-bis trimethylsilylaminopropylmethyldiethoxysilane and the like.

Examples of arylalkoxysilane compounds include phenyltrimethoxysilane, phenyltriethoxysilane, phenyltri-n-propoxysilane, phenyltri-n-butoxysilane, phenyltriphenoxysilane, and the like.

Examples of alkenylalkoxysilane compounds include vinyltrimethoxysilane, vinyltriethoxysilane, vinyltri-n-propoxysilane, vinyltri-n-butoxysilane, vinyltriphenoxysilane, allyltrimethoxysilane, octenyltrimethoxysilane, divinyldimethoxysilane, and the like.

Examples of haloalkoxysilane compounds include trimethoxychlorosilane, triethoxychlorosilane, tri-n-propoxychlorosilane, tri-n-butoxychlorosilane, triphenoxychlorosilane, dimethoxydichlorosilane, diethoxydichlorosilane, di-n-propoxydichlorosilane, diphenoxydichlorosilane, methoxytrichlorosilane, ethoxytrichlorosilane, n-propoxytrichlorosilane, phenoxytrichlorosilane, trimethoxybromosilane, triethoxybromosilane, tri-n-propoxybromosilane, triphenoxybromosilane, dimethoxydibromosilane, diethoxydibromosilane, di-n-propoxydibromosilane, diphenoxydibromosilane, methoxytribromosilane, ethoxytribromosilane, n-propoxytribromosilane, phenoxytribromosilane, trimethoxyiodosilane, triethoxyiodosilane, tri-n-propoxyiodosilane, triphenoxyiodosilane, dimethoxydiiodosilane, di-n-propoxydiiodosilane, diphenoxydiiodosilane, methoxytriiodosilane, ethoxytriiodosilane, n-propoxytriiodosilane, phenoxytriiodosilane, and the like.

In one or more embodiments, the alkoxysilane functionalizing agent includes a tetraalkoxysilane compound. In one embodiment, the alkoxysilane functionalizing agent is tetraethylorthosilicate.

In one or more embodiments, the reactive polymer can be prepared by any polymerization methods known in the art. Various types of monomer, catalyst, and solvent can be employed as ingredients for preparing the active polymerization mixture. The practice of one or more embodiments of the present invention is not limited by the selection of any particular polymerization method or any particular types of ingredients used to prepare the polymerization mixture. Reactive polymers may include those initiated by an anionic initiator or a coordination catalyst. In these or other embodiments, the propagating polymeric species may be referred to as a living or pseudo-living polymer, or simply as a reactive polymer.

In one or more embodiments, the reactive polymer that is functionalized as described above includes an anionically polymerized polymer (i.e., polymer prepared by anionic polymerization techniques). Anionically-polymerized living polymers may be formed by reacting anionic initiators with certain unsaturated monomers to propagate a polymeric structure. Throughout formation and propagation of the polymer, the polymeric structure may be anionic and "living." A new batch of monomer subsequently added to the reaction can add to the living ends of the existing chains and increase the degree of polymerization. A living polymer, therefore, includes a polymeric segment having a living or reactive end. Anionic polymerization is further described in George Odian, Principles of Polymerization, ch. 5 (3rd Ed. 1991), or Panek, 94 J. Am. Chem. Soc., 8768 (1972), which are incorporated herein by reference.

Monomers that can be employed in preparing an anionically polymerized living polymer include any monomer capable of being polymerized according to anionic polymerization techniques. These monomers include those that lead to the formation of elastomeric homopolymers or copolymers, and include, without limitation, conjugated $C_4$-$C_{12}$ dienes, $C_8$-$C_{20}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and in one embodiment 95:5 to 65:35.

One type of living polymer is a copolymer of styrene and 1,3-butadiene (SBR). In one or more embodiments, the styrene content of the SBR copolymer is from about 10 to about 50 percent by weight of the total polymer, and in other embodiments, from about 18 to about 40 percent by weight of the total polymer. In one or more embodiments, from about 8 to about 99 percent of the units derived from the 1,3-butadiene may be the 1,2-vinyl microstructure, in another embodiment from about 10 to about 60 percent of the units derived from the 1,3-butadiene are of the 1,2-vinyl microstructure.

The remaining units derived from the 1,3-butadiene may be in the 1,4-cis- or 1,4-trans-microstructure at a relative ratio of about 3 cis-units to 5 trans-units.

Any anionic initiator can be employed to initiate the formation and propagation of the living polymers. In one or more embodiments, the anionic initiator comprises at least one element from Group 1 or Group 2 of the Periodic Table, according to the new notation of the IUPAC, as reported in Hawley's Condensed Chemical Dictionary, (13th Ed. 1997). The elements in Groups 1 and 2 are commonly referred to as alkali metals and alkaline earth metals, respectively. In one or more embodiments, the anionic initiator comprises lithium.

Anionic initiators include, but are not limited to, alkyl lithium initiators such as n-butyl lithium, arenyllithium initiators, arenylsodium initiators, N-lithium dihydro carbon amides, aminoalkyllithiums, and alkyl tin lithiums. Other useful initiators include N-lithiohexamethyleneimide, N-lithiopyrrolidinide, and N-lithiododecamethyleneimide as well as organolithium compounds such as the alkyl lithium adducts of substituted aldimines and substituted ketimines, N-lithio salts of substituted secondary amines, and organosulfur compounds, such as sulfur-containing heterocycles. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, 5,786,441 and 7,153,919 which are incorporated herein by reference. In one embodiment, the anionic polymerization is conducted in the absence of lanthanide compounds such as those used in coordination catalysis.

The amount of initiator employed in conducting anionic polymerizations can vary widely based upon the desired polymer characteristics. In one embodiment, the amount of initiator is from about 0.1 to about 100, and in other embodiments from about 0.33 to about 10 mmol of initiator per 100 g of monomer.

Anionic polymerizations are typically conducted in a polar solvent such as tetrahydrofuran (THF) or a nonpolar hydrocarbon such as the various cyclic and acyclic hexanes, heptanes, octanes, pentanes, their alkylated derivatives, and mixtures thereof, as well as benzene.

In order to promote randomization in copolymerization and to control vinyl content, a polar coordinator may be added to the polymerization ingredients. Amounts range between 0 and 90 or more equivalents per equivalent of lithium. The amount of polar coordinator may depend on the amount of vinyl desired, the level of styrene employed and the temperature of the polymerization, as well as the nature of the specific polar coordinator (modifier) employed. Polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of polar coordinators include tetrahydrofuran (THF), linear and cyclic oligomeric oxolanyl alkanes such as 2,2-bis(2'-tetrahydrofuryl) propane, di-piperidyl ethane, dipiperidyl methane, hexamethylphosphoramide, N—N'-dimethylpiperazine, diazabicyclo[2-2-2]octane, dimethyl ether, diethyl ether, tributylamine and the like. The linear and cyclic oligomeric oxolanyl alkane modifiers are described in U.S. Pat. No. 4,429,091, incorporated herein by reference.

In other embodiments, a coordination catalyst may be employed. Coordination catalysts can be one-, two-, three- or multi-component systems. In one or more embodiments, a coordination catalyst may be formed by combining a heavy metal compound (e.g., a transition metal compound or a lanthanide compound), an alkylating agent (e.g., an organoaluminum compound), and optionally other co-catalyst components.

Various procedures can be used to prepare coordination catalysts. In one or more embodiments, a coordination catalyst may be formed in situ by separately adding the catalyst components to the monomer to be polymerized in either a stepwise or simultaneous manner. In other embodiments, a coordination catalyst may be preformed. That is, the catalyst components are pre-mixed outside the polymerization system either in the absence of any monomer or in the presence of a small amount of monomer. The resulting preformed catalyst composition may be aged, if desired, and then added to the monomer that is to be polymerized.

Examples of coordination catalyst systems include nickel-based systems, cobalt-based systems, and lanthanide-based systems. Useful nickel-based catalyst systems are disclosed in U.S. Pat. Nos. 6,479,601, 6,451,934, 4,562,172, 4,562,171, and 4,223,116, which are incorporated herein by reference. Useful cobalt-based systems are disclosed in U.S. Pat. Nos. 6,479,601, 4,954,125, 4,562,172, 4,562,171, and 4,522,988, which are incorporated herein by reference. Useful lanthanide-based catalyst systems are disclosed in U.S. Pat. Nos. 6,897,270, 7,094,849, 6,992,147, and 7,008,899, which are incorporated herein by reference; as well as U.S. Pat. Nos. 7,879,952, 7,671,138, 7,732,534, and U.S. Patent Application Publication No. 2008/014745, which are incorporated herein by reference. In particular embodiments, a lanthanide-based catalyst system is employed for polymerizing conjugated diene monomers into cis-1,4-polydienes. As is known in the art, these systems are effective in polymerizing conjugated diene monomer into high cis-1.4 polydienes.

In one or more embodiments, the polymerization mixture may optionally include a solvent. Suitable solvents include those organic compounds that will not undergo polymerization or incorporation into the propagating polymer chain in the presence of catalyst. In one or more embodiments, these organic species are liquid at ambient temperature and pressure. In one or more embodiments, these organic solvents are inert to the catalyst composition. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Commercial mixtures of the above hydrocarbons may also be used. For environmental reasons, aliphatic and cycloaliphatic hydrocarbons are highly preferred. The low-boiling hydrocarbon solvents are typically separated from the polymer upon completion of the polymerization.

Reactive polymers can be prepared by either batch or continuous methods. A batch polymerization may be begun by charging a blend of monomer(s) and solvent to a suitable reaction vessel, followed by the addition of the polar coordinator (if employed) and an initiator compound or catalyst system. The reactants may be heated to a temperature of from about 20 to about 200° C. and the polymerization is allowed to proceed for from about 0.1 to about 24 hours. This reaction produces a reactive polymer having a reactive or living end. In one or more embodiments, at least about 30 percent of the polymer molecules contain a reactive end. In other embodiments, at least about 50 percent of the polymer molecules contain a reactive end.

A continuous polymerization may be begun by charging monomer(s), initiator or catalyst and solvent at the same time to a suitable reaction vessel. Thereafter, a continuous procedure may be followed that removes product after a suitable residence time and replenishes the reactants.

In one embodiment, the reaction to produce alkoxysilyl-functionalized polymer can be achieved by simply mixing the alkoxysilane functionalizing agent with the reactive polymer. In certain embodiments, the functionalizing agent is added once a peak polymerization temperature, which is indicative of nearly complete monomer conversion, is observed. Because reactive ends may self-terminate, in one or more embodiments the functionalizing agent may be added within about 25 to 35 minutes of the peak polymerization temperature.

The reactive polymer is typically contacted with the alkoxysilane functionalizing agent in a solvent. In one or more embodiments, the solvent is one in which both the polymer and functionalizing agent are soluble. In one embodiment, the reaction can occur in the same medium in which the polymerization occurred.

The amount of alkoxysilane functionalizing agent that can be reacted with the reactive polymer may depend on various factors including the type and amount of catalyst or initiator used to initiate the polymerization and the desired degree of functionalization. In one or more embodiments, where the reactive polymer is prepared by employing a lanthanide-based catalyst, the amount of the alkoxysilane functionalizing agent employed can be described with reference to the lanthanide metal of the lanthanide compound. For example, the molar ratio of the alkoxysilane functionalizing agent to the lanthanide metal may be from about 1:1 to about 200:1, in other embodiments from about 5:1 to about 150:1, and in other embodiments from about 10:1 to about 100:1.

In other embodiments, such as where the reactive polymer is prepared by using an anionic initiator, the amount of the alkoxysilane functionalizing agent employed can be described with reference to the amount of metal cation associated with the initiator. For example, where an organolithium initiator is employed, the molar ratio of the alkoxysilane functionalizing agent to the lithium metal may be from about 0.3:1 to about 1.1:1, in other embodiments from about 0.4:1 to about 1:1, and in other embodiments from 0.5:1 to about 0.9:1. It will be appreciated that these numbers are based upon the amount of initiator added to the system, and may or may not reflect the amount of initiator that is associated with the polymer.

Rubbery polymers modified with a silane compound are described in U.S. Pat. No. 5,066,721 which is incorporated by reference herein.

In one embodiment, at least about 30 percent of the polymer molecules are functionalized with the alkoxysilane functionalizing agent. In a further embodiment, at least about 50 percent of the polymer molecules are functionalized with the alkoxysilane functionalizing agent.

Amino alcohols include primary, secondary and tertiary amines. Examples of amino alcohols include 2-aminoethanol, N-(3-aminopropyl)-N, N-diethanolamine, 2-amino-2-methyl-1-propanol, 2-amino-1-butanol, 2-amino-2-ethyl-1, 3-propanediol, 2-amino-2-methyl-1,3-propanediol, tris (hydroxymethyl)-aminomethane, or 2-amino-2-hydroxymethyl-1,3-propanediol, monoethanolamine, diethanolamine, triethanolamine, N-methylethanolamine, N,N-dimethylethanolamine, N,N-dibutylethanolamine, N,N-diethylethanolamine, N-methyl-N,N-diethanolamine, 2-amino-2-methylpropanol, 3-aminopropanol, 2-aminopropanol, and the like. In one embodiment the amino alcohol is a primary amine. In another embodiment the amino alcohol is 2-aminoethanol. In a further embodiment the amino alcohol is N-(3-aminopropyl)-N,N-diethanolamine.

In one or more embodiments, the amino alcohol may be added to the reaction mixture of alkoxysilyl-functional polymer after a sufficient reaction period has occurred. In one embodiment, the amino alcohol is added within about one hour of the time that the previous reactant, i.e. the alkoxysilyl functionalizing agent is introduced to the reactive polymer. Optionally, this can be delayed if necessary. In another embodiment, the amino alcohol may be added within about 30 minutes of the time that the previous reactant is added.

In one or more embodiments, the alkoxysilyl-functional polymer may be contacted with the amino alcohol in a solvent. In one or more embodiments, the solvent may include one in which both the alkoxysilyl-functional polymer and amino alcohol are soluble. In one embodiment, the reaction can occur in the same medium in which the polymerization occurred.

The amount of amino alcohol that can be reacted with the reactive polymer may depend on various factors including the type and amount of catalyst or initiator used to initiate the polymerization and the desired degree of functionalization. In one or more embodiments, where the reactive polymer is prepared by employing a lanthanide-based catalyst, the amount of the amino alcohol employed can be described with reference to the lanthanide metal of the lanthanide compound. For example, the molar ratio of the amino alcohol to the lanthanide metal may be from about 1:1 to about 200:1, in other embodiments from about 5:1 to about 150:1, and in other embodiments from about 10:1 to about 100:1.

In other embodiments, such as where the reactive polymer is prepared by using an anionic initiator, the amount of the amino alcohol employed can be described with reference to the amount of metal cation associated with the initiator. For example, where an organolithium initiator is employed, the molar ratio of the amino alcohol to the lithium metal may be from about 0.3:1 to about 3:1, in other embodiments from about 0.4:1 to about 0.9:1, and in other embodiments from 0.5:1 to about 0.8:1. It will be appreciated that these numbers are based upon the amount of initiator added to the system, and may or may not reflect the amount of initiator that is associated with the polymer.

In one embodiment, at least about 25 percent of the alkoxysilyl-functionalized polymer molecules are also functionalized by the amino alcohol. In another embodiment, at least about 40 percent of the alkoxysilyl-functionalized polymer molecules are also functionalized with the amino alcohol. In yet another embodiment, at least about 50 percent of alkoxysilyl-functionalized polymer molecules also contain amino alcohol functionality.

It will be understood that the functionalization process of the present invention may result in a mixture of polymer molecules, including alkoxysilyl-functionalized polymer molecules, amine-containing alkoxysilyl-functionalized polymer molecules, and polymer molecules that are not functionalized by either the alkoxysilane or amino alcohol. The relative amounts of each of these types of polymer molecules can be adjusted to desired levels by, for example, adjusting the amounts of alkoxysilane and/or amino alcohol used relative to polymer, and reaction conditions.

After formation of the functionalized polymer, a processing aid and other optional additives such as oil can optionally be added to the polymer cement. The functionalized polymer and other optional ingredients are then isolated from the solvent and preferably dried. Conventional procedures for desolventization and drying may be employed. In one embodiment, the functionalized polymer may be isolated from the solvent by steam desolventization or hot water coagulation of the solvent followed by filtration. Residual solvent may be removed by using conventional drying techniques such as oven drying or drum drying. Alternatively, the polymer cement may be directly drum dried.

In one embodiment, the alkoxysilane is tetraethylorthosilicate and the amino alcohol is 2-amino alcohol. In another embodiment, the alkoxysilane is tetraethylorthosilicate and the amino alcohol is N-(3-aminopropyl)-N,N-diethanolamine.

In alternative embodiments, the alkoxy-functionalized polymers can prepared by employing hydrosilylation techniques. This technique is particularly useful for preparing functionalized polymers from polymers containing unsaturation. Also, these techniques yield polymers having backbone functionality (i.e. the functional groups are pendant to the backbone of the polymer).

In an exemplary embodiment, a polymer such as an ethylene-propylene-diene terpolymer (or other polymer containing unsaturation) can be treated with a hydrosilylating compound such as $HSiOR_3$ or $HSiCl_3$ and an appropriate catalyst, such as Karsted's catalyst or chloroplatinic acid or other's know in the art, to provide a polymer having alkoxysilyl groups grafted to the backbone of the polymer. Hydrosilylation techniques and the conditions under which they take place are known in the art. In accordance with practice of the present invention, the functionalized polymer containing alkoxysilyl groups is then treated with an amino alcohol to provide the functionalized polymers of this invention.

The functionalized polymers of one or more embodiments of this invention are particularly useful in preparing tire components. These tire components can be prepared by using the functionalized polymers of this invention alone or together with other rubbery polymers. In one or more embodiments, a tire component is prepared from a mixture of polymers that include alkoxysilyl-functionalized polymer molecules, amine-containing alkoxysilyl-functionalized polymer molecules, and polymer molecules that are not functionalized by either the alkoxysilane or amino alcohol. The amounts of alkoxysilyl-functionalized polymer molecules and amine-containing alkoxysilyl-functionalized polymer molecules that are present can vary widely, but in one or more embodiments, the ratio of alkoxysilyl-functionalized polymer molecules to amine-containing alkoxysilyl-functionalized polymer molecules in the tire formulation is from about 0.1:1 to about 5:1, in other embodiments from about 0.2:1 to about 4:1, in yet other embodiments from about 0.5:1 to about 3:1 and in yet other embodiments from about 0.8:1 to about 1.5:1.

Other rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in 20 Kirk-Othmer, Encyclopedia of Chemical Technology, 365-468, (3rd Ed. 1982), particularly Vulcanization Agents and Auxiliary Materials, 390-402, and A. Y. Coran, Vulcanization in Encyclopedia of Polymer Science and Engineering, (2nd Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These stocks are useful for forming tire components such as treads, subtreads, black sidewalls, body ply skins, bead filler, and the like. In one or more embodiments, the functional polymers are employed in tread formulations, and these tread formulations will include from about 10 to about 100% by weight of the functionalized polymer based on the total rubber within the formulation. In other embodiments, the tread formulation will include from about 35 to about 90% by weight, and in yet other embodiments from about 50 to 80% by weight of the functional polymer based on the total weight of the rubber within the formulation. The preparation of vulcanizable compositions and the construction and curing of the tire is not affected by the practice of this invention.

In one or more embodiments, the vulcanizable rubber composition is prepared by forming an initial masterbatch that includes the rubber component and filler. This initial masterbatch may be mixed at a starting temperature of from about 25° C. to about 125° C. with a discharge temperature of about 135° C. to about 180° C. To prevent premature vulcanization (also known as scorch), this initial masterbatch generally excludes any vulcanizing agents. Once the initial masterbatch is processed, the vulcanizing agents may be introduced and blended into the initial masterbatch at low temperatures in a final mix stage, which does not initiate the vulcanization process. Optionally, additional mixing stages, sometimes called remills, can be employed between the masterbatch mix stage and the final mix stage. Rubber compounding techniques and the additives employed therein are generally known as disclosed in Stephens, The Compounding and Vulcanization of Rubber, in Rubber Technology (2nd Ed. 1973). The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization may be effected by heating the vulcanizable composition in a mold; e.g., it is heated to about 140 to about 180° C. Cured or crosslinked rubber compositions may be referred to as vulcanizates, which generally contain three-dimensional polymeric networks that are thermoset. The other ingredients, such as processing aides and fillers, are generally evenly dispersed throughout the vulcanized network. Pneumatic tires can be made as discussed in U.S. Pat. Nos. 5,866,171, 5,876,527, 5,931,211, and 5,971,046, which are incorporated herein by reference.

In certain embodiments, the functionalized polymers of this invention provide carbon black, carbon black/silica, and silica filled-rubber vulcanizates with an advantageous balance of properties. Exemplary vulcanizates exhibit reduced hysteresis loss. Filled-rubber vulcanizates prepared with the functionalized polymers of this invention also exhibit a reduced Payne effect in some embodiments. Polymer processability, as indicated by Mooney viscosity, can also be maintained. These functionalized polymers can be readily prepared by terminating living polymers.

In order to demonstrate the practice of the present invention, the following examples have been prepared and tested. The examples should not, however, be viewed as limiting the scope of the invention. The claims will serve to define the invention.

EXAMPLES

Example 1

Synthesis of Tetraethylorthosilicate Terminated Control Polymer

To a 19 Liter reactor equipped with turbine agitator blades was added 5.0 g kg hexane, 1.20 kg 34.0 wt % styrene in hexane, and 7.24 kg 22.6 wt % butadiene in hexane. The reactor was charged 11.06 mL of 1.60 M butyl lithium in hexane and 3.83 mL of 1.6 M 2,2'-di(tetrahydrofuryl) propane in hexane and the batch temperature was controlled at 49° C. After approximately 1 hour, the batch was cooled to 32° C. and one mole of tetraethylorthosilicate per mole of butyl lithium was added. A sample was taken, coagulated in isopropanol and drum dried. The isolated polymer had the following properties: Mn=202.1 kg/mol, Mw=345.7 kg/mol, Tg=−31.2° C.

Example 2

Synthesis of Tetraethylorthosilicate Terminated Polymer Treated with 2-Aminoethanol Approximately 400 g of polymer cement was transferred from the 19 Liter reactor used in Example 1 and placed into a 0.8 L nitrogen purged bottle. To the bottle was added one mole of 2-aminoethanol per mole of butyl lithium. The bottle contents were then coagulated in isopropanol and drum dried. The isolated polymer had the following properties: Mn=201.1 kg/mol, Mw=322.1.7 kg/mol, Tg=−31.2° C.

Example 3

Synthesis of Tetraethylorthosilicate Terminated Polymer Treated with N-(3-aminopropyl)-N,N-diethanolamine Approximately 400 g of cement was transferred from the 19 Liter reactor used in Example 1 and placed into a 0.8 L nitrogen purged bottle. To the bottle was added one mole of N-(3-aminopropyl)-N,N-diethanolamine per 2 moles of butyl lithium. The bottle contents were then coagulated in isopropanol and drum dried. The isolated polymer had the following properties: Mn=188.9 kg/mol, Mw=269.0 kg/mol, Tg=−31.2° C.

The polymers resulting from Examples 1-3 were subsequently used to make carbon black-silica filled rubber compounds. The formulations for the carbon black-silica compounds are presented in Table 1. Each compound was mixed using three stages: initial, remill and final. A 65 g Banbury mixer was used for all mixing stages.

TABLE 1

| Ingredient | Example 4 (amounts in phr) | Example 5 (amounts in phr) | Example 6 (amounts in phr) |
|---|---|---|---|
| Initial Mixing Stage | | | |
| Polymer from Example 1 | 100 | | |
| Polymer from Example 2 | | 100 | |
| Polymer from Example 3 | | | 100 |
| Carbon Black | 35 | 35 | 35 |
| Silica | 30 | 30 | 30 |
| Antioxidant | 0.95 | 0.95 | 0.95 |
| Stearic Acid | 1.5 | 1.5 | 1.5 |
| Aromatic Oil | 10 | 10 | 10 |
| Total parts | 177.45 | 177.45 | 177.45 |
| Remill Mixing Stage | | | |
| 60% Silane Shielding Agent on Wax | 4.57 | 4.57 | 4.57 |
| | 0 | 0 | 0 |
| Total Parts | 182.02 | 182.02 | 182.02 |
| Final Mixing Stage | | | |
| Sulfur | 1.7 | 1.7 | 1.7 |
| Accelerators | 2.25 | 2.25 | 2.25 |
| Zinc Oxide | 2.5 | 2.5 | 2.5 |
| Total Parts | 188.47 | 188.47 | 188.47 |

In the initial mixing stage, polymer was mixed with carbon black, silica, an antioxidant, stearic acid, and aromatic oil. For the initial mixing stage the mixer operating conditions were 60 rpm and 133° C. First, polymer was placed in the mixer, and after 0.5 minutes, the fillers, antioxidant and aromatic oil were added. After an additional 3 minutes of mixing, the stearic acid was added. After the addition of the stearic acid, the compounds were mixed for approximately 5-6 minutes. At the end of initial mixing stage the mixer temperature was approximately 165° C. The resulting compounds were then transferred to a mill operating at a temperature of 60° C., where they were sheeted and subsequently cooled to room temperature.

During the remill mixing stage, silane shielding agent was added to the compounds from the initial mixing stage. The mixer temperature at the start of the remill stage was 95° C. and the mixer was operating at 60 rpm. The compounds were mixed for 3 minutes, to a compound temperature of 145° C. The samples were transferred to a mill operating at a temperature of 60° C., where they were sheeted and subsequently cooled to room temperature.

In the final mixing stage, the curative materials were added to the compounds from the remill mixing stage. The mixer temperature at the start of the final mixing stage was 65° C. and the mixer was operating at 60 rpm. The compounds were each mixed for 2.5 minutes, to a compound temperature of between 90-95° C. The compounds were sheeted into Dynastat buttons and 15.24 cm×15.24 cm×0.19 cm sheets. These samples were then cured at 171° C. for 15 minutes in standard molds using a hot press. The results of the subsequent compound testing are presented in Table 2.

TABLE 2

| Property | Example 4 | Example 5 | Example 6 |
|---|---|---|---|
| $ML_{1+4}$ (130° C.) | 79.3 | 82.2 | 79.7 |
| $T_5$ (min) | 26.4 | 26.5 | 28.4 |
| 200% Modulus @ 23° C. (MPa) | 10.53 | 11.00 | 11.11 |
| Tensile at Break @23° C. (MPa) | 16.22 | 16.31 | 15.32 |
| Elongation at Break @23° C. (%) | 279 | 270 | 255 |
| tan δ 5% E, 50° C. (10 Hz) | 0.162 | 0.153 | 0.150 |
| ΔG' (50° C.) (MPa)* (10 Hz) | 2.403 | 2.198 | 1.890 |
| tan δ 0.5% E, 0° C. (10 Hz) | 0.419 | 0.436 | 0.550 |
| Shore A Peak (23° C.) | 71.9 | 69.4 | 68.8 |

*ΔG' = G'(0.25% E) − G'(14.0% E)

As can be seen in Table 2, the compounds containing the amino alcohol treated, alkoxysilyl-functionalized polymers (Examples 5 and 6) had lower tan δ at 50° C. values, a predictor for better rolling resistance, when compared to the compound containing the alkoxysilyl-functionalized polymer (Example 4). Also, the ΔG' values for Examples 5 and 6 are lower than that of Example 4, indicating that the Payne Effect has been reduced. Additionally, the tan δ at 0° C. values for Examples 5 and 6 are higher than the value for Example 4, indicating better wet traction.

Various modifications and alterations that do not depart from the scope and spirit of this invention will become apparent to those skilled in the art. This invention is not to be duly limited to the illustrative embodiments set forth herein.

What is claimed is:

1. A vulcanizate comprising the vulcanization product of a functionalized polymer that is prepared by reacting a reactive polymer with an alkoxysilane functionalizing agent to produce an alkoxysilyl-functionalized polymer; and reacting the alkoxysilyl-functionalized polymer with an amino alcohol, where the reactive polymer is a polydiene or a copolymer of styrene and 1,3-butediene.

2. The vulcanizate of claim 1, where the alkoxysilane functionalizing agent comprises a compound represented by the formula $$(R^1)_{4-x}Si(OR^2)_x$$

where each $R^1$ is independently chlorine, bromine, iodine, fluorine, or a monovalent organic group, each $R^2$ is independently hydrogen or a monovalent organic group, and z is an integer from 1 to 4.

3. The vulcanizate of claim 1, where the alkoxysilane functionalizing agent comprises tetraethylorthosilicate, tetramethylorthosilicate, tetrapropylorthosilicate, or a derivative thereof.

4. The vulcanizate of claim 1, where the amino alcohol comprises 2-aminoethanol, N-(3-aminopropyl)-N,N-diethanolamine, 2-amino-2-methyl-1-propanol, 2-amino-1-butanol, 2-amino-2-ethyl-1,3-propanediol, 2-amino-2-methyl-1,3-propanediol, tris (hydroxymethyl)-aminomethane, or 2-amino-2-hydroxymethyl-1,3-propanediol, monoethanolamine, diethanolamine, triethanolamine, N-methylethanolamine, N,N-dimethylethanolamine, N,N-dibutylethanolamine, N,N-diethylethanolamine, N-methyl-N,N-diethanolamine, 2-amino-2-methylpropanol, 3-aminopropanol, or 2-aminopropanol.

5. A tire comprising: at least one vulcanized rubber and a filler, where the at least one vulcanized rubber comprises a vulcanization product of a functionalized polymer that is prepared by reacting a reactive polymer with an alkoxysilane functionalizing agent to produce an alkoxysilyl-functionalized polymer; and reacting the alkoxysilyl-functionalized polymer with an amino alcohol, where the reactive polymer is a polydiene or a copolymer of styrene and 1,3-butediene.

6. The vulcanizate of claim 2, where the monovalent organic group is an alkyl, cycloalkyl, substituted cycloalkyl, alkenyl, cycloalkenyl, substituted cycloalkenyl, aryl, allyl, substituted aryl, aralkyl, alkaryl, alkynyl, or epoxy group.

7. The vulcanizate of claim 1, where the reactive polymer is a high cis-1,4-polydiene.

8. The vulcanizate of claim 1, where the reactive polymer is an anionically polymerized living polymer.

9. The vulcanizate of claim 1, where the reactive polymer is polymerized by using coordination catalyst techniques.

10. The vulcanizate of claim 1, where the reactive polymer is an ethylene-propylene-diene terpolymer.

11. The tire of claim 5, where the alkoxysilane functionalizing agent comprises a compound represented by the formula $$(R^1)_{4-x}Si(OR^2)_x$$

where each $R^1$ is independently chlorine, bromine, iodine, fluorine, or a monovalent organic group, each $R^2$ is independently hydrogen or a monovalent organic group, and z is an integer from 1 to 4.

12. The tire of claim 5, where the alkoxysilane functionalizing agent comprises tetraethylorthosilicate, tetramethylorthosilicate, tetrapropylorthosilicate, or a derivative thereof.

13. The tire of claim 5, where the amino alcohol comprises 2-aminoethanol, N-(3-aminopropyl)-N,N-diethanolamine, 2-amino-2-methyl-1-propanol, 2-amino-1-butanol, 2-amino-2-ethyl-1,3-propanediol, 2-amino-2-methyl-1,3-propanediol, tris (hydroxymethyl)-aminomethane, or 2-amino-2-hydroxymethyl-1,3-propanediol, monoethanolamine, diethanolamine, triethanolamine, N-methylethanolamine, N,N-dimethylethanolamine, N,N-dibutylethanolamine, N,N-diethylethanolamine, N-methyl-N,N-diethanolamine, 2-amino-2-methylpropanol, 3-aminopropanol, or 2-aminopropanol.

14. The vulcanizate of claim 1, where the vulcanizate is characterized by a reduction in ΔG' of from about 8.5 to about 21%, when compared to a vulcanizate prepared by the same process, except that the alkoxysilyl-functionalized polymer is not reacted with an amino alcohol.

15. The tire of claim 5, where the vulcanized rubber is characterized by a reduction in ΔG' of from about 8.5 to about 21%, when compared to a vulcanizate prepared by the same process, except that the alkoxysilyl-functionalized polymer is not reacted with an amino alcohol.

16. The vulcanizate of claim 1, where said step of reacting the alkoxysilyl-functionalized polymer with an amino alcohol occurs in a solvent, whereupon after reaction the functionalized polymer is isolated and removed from the solvent by filtration or drying.

17. The vulcanizate of claim 1, further comprising the step of mixing the functionalized polymer, filler, and optionally other rubbery polymers, to form an initial masterbatch.

18. The tire of claim 5, where said step of reacting the alkoxysilyl-functionalized polymer with an amino alcohol occurs in a solvent, whereupon after reaction the functionalized polymer is isolated and removed from the solvent by filtration or drying.

19. The tire of claim 5, where at least 25% of the alkoxysilyl-functionalized polymer molecules are reacted with an amino alcohol.

* * * * *

UNITED STATES PATENT AND TRADEMARK OFFICE
CERTIFICATE OF CORRECTION

PATENT NO. : 8,148,486 B2
APPLICATION NO. : 11/962221
DATED : April 3, 2012
INVENTOR(S) : Hogan et al.

It is certified that error appears in the above-identified patent and that said Letters Patent is hereby corrected as shown below:

In column 15, line 53, Claim 2, delete "$(R^1)_{4-x}Si(OR^2)_x$" and insert -- $(R^1)_{4-z}Si(OR^2)_z$ --.

In column 15, line 63, Claim 4, delete "N-(3-aminopropyl)-N,N-diethanolamine" and insert -- N-(3-aminopropyl)-N, N-diethanolamine --.

In column 16, line 30, Claim 11, delete "$(R^1)_{4-x}Si(OR^2)_x$" and insert -- $(R^1)_{4-z}Si(OR^2)_z$ --.

In column 16, line 40, Claim 13, delete "N-(3-aminopropyl)-N,N-diethanolamine" and insert -- N-(3-aminopropyl)-N, N-diethanolamine --.

Signed and Sealed this
Eleventh Day of December, 2012

David J. Kappos
*Director of the United States Patent and Trademark Office*